United States Patent
Skrocki

(10) Patent No.: US 12,286,059 B2
(45) Date of Patent: Apr. 29, 2025

(54) VEHICULAR CAMERA ASSEMBLY WITH CROSS-LINKED THERMOPLASTIC COMPONENTS

(71) Applicant: Magna Electronics Inc., Auburn Hills, MI (US)

(72) Inventor: Gavin E. Skrocki, Bay City, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 129 days.

(21) Appl. No.: 18/457,489

(22) Filed: Aug. 29, 2023

(65) Prior Publication Data

US 2024/0067093 A1 Feb. 29, 2024

Related U.S. Application Data

(60) Provisional application No. 63/373,871, filed on Aug. 30, 2022.

(51) Int. Cl.
| | |
|---|---|
| *H04N 23/55* | (2023.01) |
| *B60R 1/22* | (2022.01) |
| *G03B 17/02* | (2021.01) |
| *H04N 23/51* | (2023.01) |

(52) U.S. Cl.
CPC ............. *B60R 1/22* (2022.01); *G03B 17/02* (2013.01); *H04N 23/51* (2023.01); *H04N 23/55* (2023.01); *B60R 2300/105* (2013.01)

(58) Field of Classification Search
CPC ....................................................... H04N 23/55
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,233,641 | B2 | 1/2016 | Sesti et al. |
| 10,071,687 | B2 | 9/2018 | Ihlenburg et al. |
| 10,099,614 | B2 | 10/2018 | Diessner |
| 11,240,411 | B2 | 2/2022 | Byrne et al. |
| 2013/0242099 | A1 | 9/2013 | Sauer et al. |
| 2014/0373345 | A1 | 12/2014 | Steigerwald |
| 2015/0222795 | A1 | 8/2015 | Sauer et al. |
| 2015/0266430 | A1 | 9/2015 | Mleczko et al. |
| 2015/0365569 | A1 | 12/2015 | Mai et al. |
| 2016/0037028 | A1 | 2/2016 | Biemer |

(Continued)

*Primary Examiner* — Y Lee
(74) *Attorney, Agent, or Firm* — HONIGMAN LLP

(57) ABSTRACT

A vehicular camera assembly includes an imager printed circuit board (imager PCB), a lens barrel accommodating a lens, and a camera housing. The imager PCB has an imager disposed at a first side of the imager PCB. The lens barrel is disposed at a first portion of the camera housing. The imager PCB is attached at the first portion or a second portion of the camera housing, and, with the imager PCB attached at the first portion or the second portion of the camera housing and with the lens barrel disposed at the first portion, the imager at the first side of the imager PCB faces the lens accommodated by the lens barrel. The vehicular camera assembly includes at least one component that (i) is formed of a thermoplastic material, and (ii) has undergone electron beam treatment (EB treatment) that crosslinks molecules between polymer chains of the thermoplastic material.

20 Claims, 4 Drawing Sheets

(56) References Cited

U.S. PATENT DOCUMENTS

| | | |
|---|---|---|
| 2016/0268716 A1 | 9/2016 | Conger et al. |
| 2017/0133811 A1 | 5/2017 | Conger et al. |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0306966 A1 | 10/2019 | Byrne et al. |
| 2020/0001787 A1 | 1/2020 | Lu et al. |
| 2020/0033549 A1 | 1/2020 | Liu et al. |
| 2020/0137926 A1 | 4/2020 | Wohlte |
| 2020/0154020 A1 | 5/2020 | Byrne et al. |
| 2021/0382375 A1 | 12/2021 | Sesti et al. |
| 2022/0103723 A1 | 3/2022 | Skrocki et al. |
| 2022/0373762 A1 | 11/2022 | Skrocki |

VEHICULAR CAMERA ASSEMBLY WITH CROSS-LINKED THERMOPLASTIC COMPONENTS

CROSS REFERENCE TO RELATED APPLICATION

The present application claims the filing benefits of U.S. provisional application Ser. No. 63/373,871, filed Aug. 30, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (preferably one or more CMOS cameras) to capture image data representative of images exterior of the vehicle, and processes image data captured by the one or more cameras to enable a system of the vehicle, such as an advanced driving assistance system (ADAS) or autonomous control system of the vehicle operable to at least partially control operation of the vehicle as it travels along the road. The system includes at least one camera that has one or more components formed from thermoplastic material and that have undergone electron beam treatment (EB treatment) to reduce tolerance and other mechanical changes that could affect focus and alignment of an imager and lens of the camera.

For example, a vehicular camera assembly includes an imager printed circuit board (imager PCB) that includes a first side and a second side opposite the first side and separated from the first side by a thickness of the imager PCB. An imager is disposed at the first side of the imager PCB. A lens barrel of the camera accommodates a lens. A camera housing includes a first portion or front housing or lens holder and a second portion or rear housing configured to join together with the first portion. The lens barrel is disposed at the first portion of the camera housing. The imager PCB is attached at one of the first portion or the second portion. With the imager PCB attached at one of the first portion or the second portion, the imager at the first side of the imager PCB is focused and aligned relative to the lens accommodated by the lens barrel. The vehicular camera assembly includes at least one component, such as the lens barrel, the front housing, and/or the rear housing, that is formed from a thermoplastic material and that has undergone EB treatment.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like. As described further below, the system includes one or more cameras that have components formed from thermoplastic and exposed to electron beam (EB) treatment. The thermoplastic camera components, having undergone EB treatment, provide greater durability and dimensional tolerances (such as due to lower levels of thermal expansion) over traditional thermoplastic and non-plastic (e.g., metal) camera components, which provides cost savings and increases the reliability and improves the quality of image data captured by the cameras over the life of the cameras.

Figure 1:
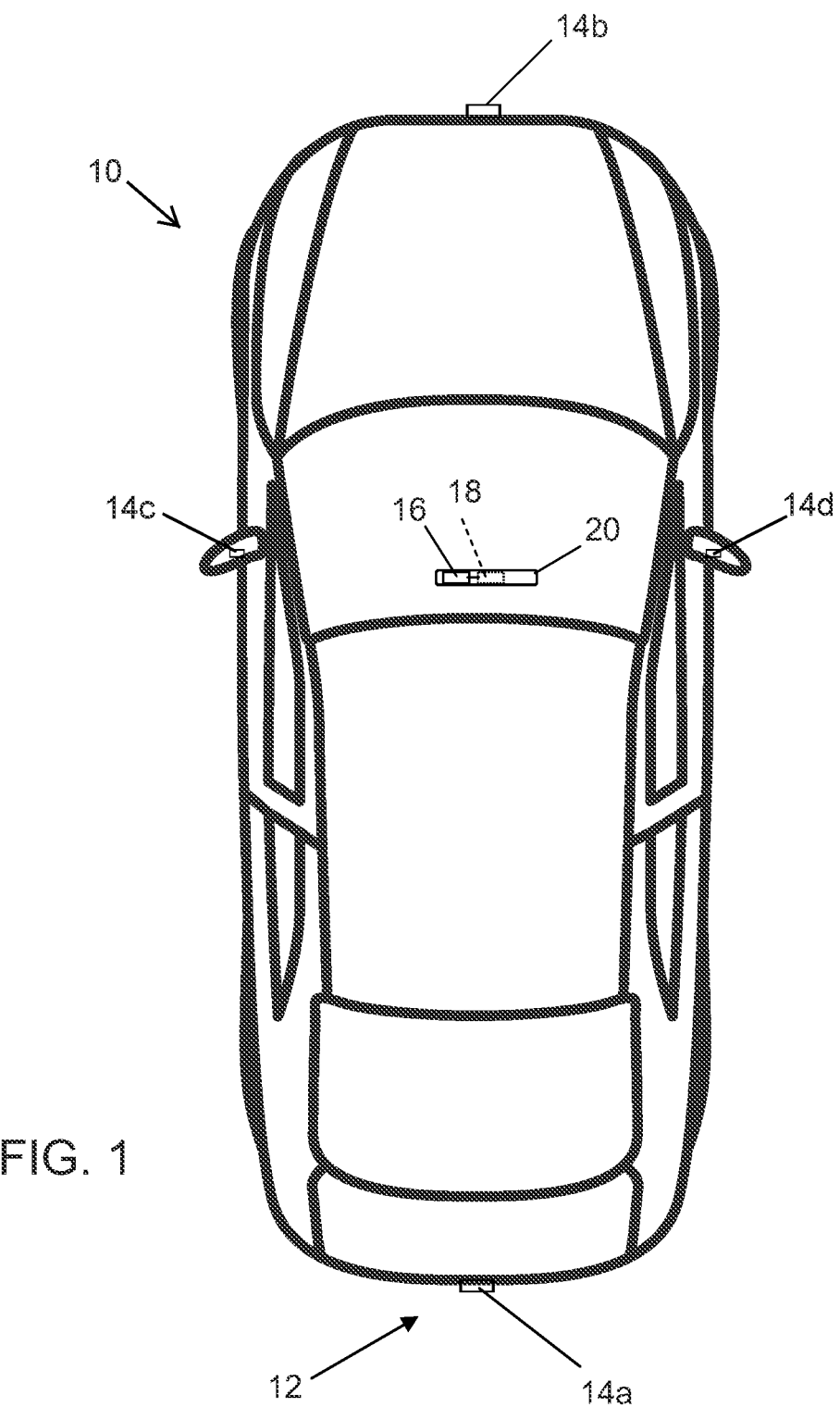
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. Thus, the vision system 12 includes one or more cameras 14 disposed at the vehicle and the vision system 12 processes image data captured by the one or more cameras 14 to enable the operation of one or more systems of the vehicle, such as for advanced driver assistance systems (ADAS), autonomous or semi-autonomous control systems, rear backup or surround view display systems, and the like.

The camera may have any suitable construction, and the lens and imager may be aligned and focused and then fixed relative to one another to maintain the alignment and focus during use of the camera on a vehicle. Typically, active focus and alignment is used to set and secure a focal position of a lens to an imager component. However, this leads to expensive and complicated measures to manage the compliance tolerances created by camera components and manufacturing focus/alignment process. For example, a camera may be assembled using an active PCB alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws or other fasteners and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV curing and additional curing. This curing increases the tolerance stack of the finished assembly.

Figure 2:
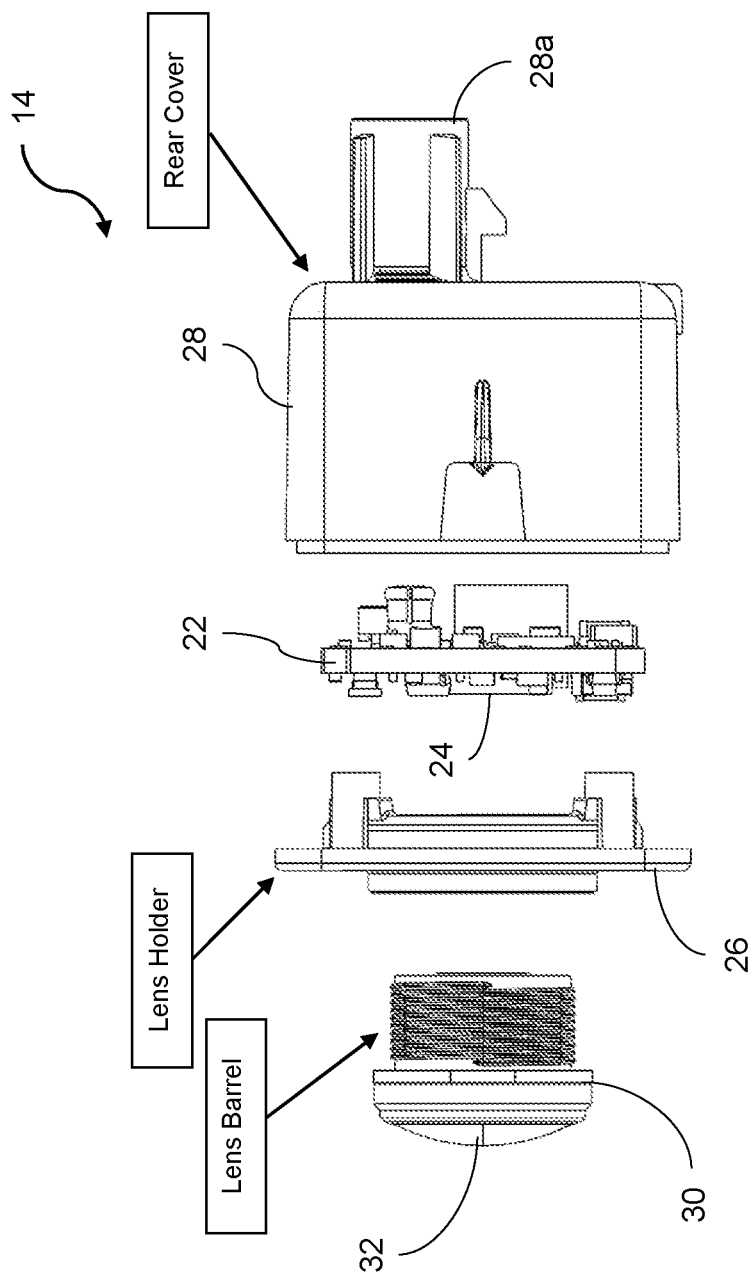
FIGS. 2 and 3 are exploded views of vehicular cameras that include components formed from thermoplastic that has undergone electron beam treatment.

For example, and as shown in FIG. 2, the camera 14 may have a printed circuit board (PCB) alignment style construction where a PCB 22 accommodating the imager 24 (i.e., the imager PCB) is adjusted relative to a fixed lens barrel or lens or optic element to focus and align the imager and the lens. In the illustrated embodiment of FIG. 2, the camera 14 includes a front housing or lens holder 26 and a rear housing 28 that are configured to join together to house the imager PCB 22. The front housing 26 includes an aperture or passageway configured to accommodate a lens barrel 30 and the lens barrel 30 accommodates one or more lens or optic elements 32. The lens barrel 30 is secured relative to the front housing 26, such as via threaded engagement and/or adhesive between the lens barrel 30 and the front housing 26. The imager PCB 22 is disposed at the lens holder and, with the lens barrel 30 secured relative to the front housing 26, the imager PCB 22 is adjusted relative to the front housing 26 to focus and align the imager 24 relative to the lens 32. With the imager 24 and lens 32 focused and aligned relative to one another, the front housing 26 and imager PCB 22 are secured relative to one another, such as via fasteners, adhesive, or laser welding, to fix alignment of the lens and imager. The rear housing 28 attaches at the front housing 26 to encase or house the imager PCB 22 within the camera housing. Optionally, the imager PCB may be attached at the rear housing and the rear housing may be adjusted relative to the front housing and lens to focus and align the imager and the lens.

The rear housing 28 may include a connector portion 28a extending from a rear surface or portion of the rear housing 28 and configured to electrically connect the camera 14 to a wire harness of the vehicle, such as via a coaxial connector, for electrical power and data transfer to and from the camera. The connector portion 28a is electrically connected to the imager PCB 22, such as directly connected to the imager PCB 22 or via a connector PCB electrically connected between the connector portion 28a and the imager PCB 22.

Figure 3:
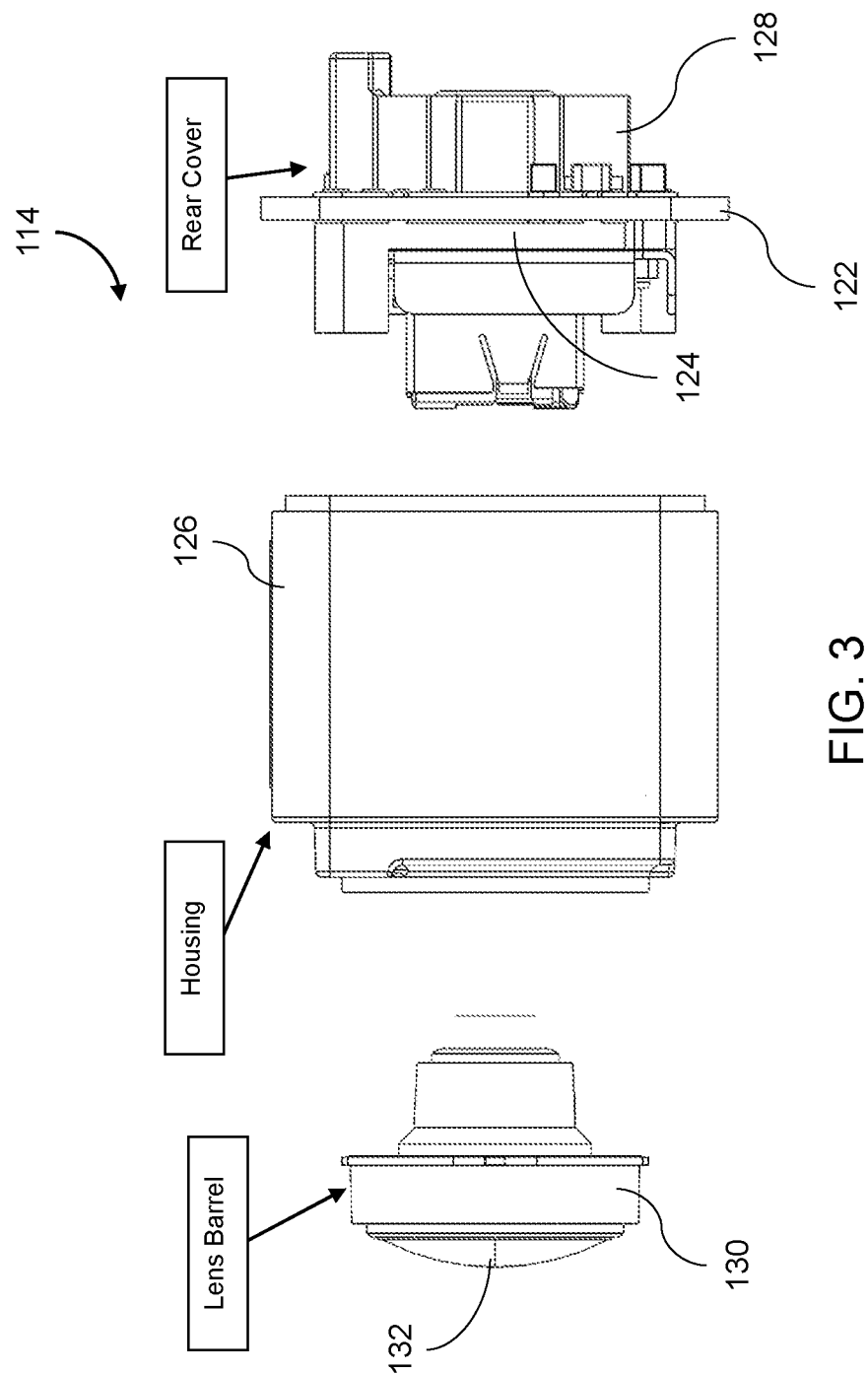

Optionally, and as shown in FIG. 3, a camera 114 may have a lens alignment style construction where an imager PCB 122 accommodating an imager 124 is secured relative to the front or rear portion of the camera housing and a lens 132 or lens barrel 130 is adjusted relative to the camera housing and fixed imager 124 to focus and align the imager 124 and lens 132. In the illustrated embodiment of FIG. 3, the imager PCB 122 is secured to the rear housing 128 that is configured to mate with the front housing 126 to form the camera housing. With the imager PCB 122 secured at the rear housing 128 and the front housing 126 coupled to the rear housing 128, the lens barrel 130 is disposed at the aperture or passageway of the front housing 126 and adjusted relative to the housing and imager PCB 122 to align and focus the imager 124 relative to the lens 132. With the imager 124 and lens 132 focused and aligned, the lens barrel 130 is fixed relative to the front housing 126, such as via adhesive or laser welding, to fix the focus and alignment of the imager 124 and lens 130.

The camera construction and alignment of the imager and lens relative to one another may utilize characteristics of the cameras, systems, and methods described in U.S. Publication Nos. US-2022-0373762; US-2022-0103723 and/or US-2021-0382375, which are hereby incorporated herein by reference in their entireties.

Vehicular cameras are often exposed to harsh conditions that include extreme temperature changes. These temperature changes can lead to warping of the camera components, such as, for example, the printed circuit board (PCB) disposed within the camera housing of the camera. Warping of one or more components can lead to focus shift of the camera, as the position of the PCB, imager, and lens change relative to each other. Because the vehicle system 12 relies on quick processing of high quality image data (i.e., the image data must be high resolution and in focus), it is important that the camera perform at a high level throughout the life of the camera and vehicle. For example, the position of the imager relative to the lens of the camera cannot significantly fluctuate without affecting the focus and quality of image data captured by the imager. However, because the cameras of the system are typically mounted at or near or behind exterior surfaces of the vehicle (such as at a rear bumper or front grill fascia of the vehicle) the cameras are exposed at the outer surface of the vehicle to harsh and variable environmental conditions such as precipitation, impacts from debris (e.g., rocks, dust, bugs, and ice), and temperature fluctuations. Therefore, the camera includes one or more components formed from durable material that is resistant to thermal expansion and contraction to maintain geometrical dimensioning and tolerances over the life of the camera.

Furthermore, industry requirements for testing and camera performance are continuously increasing. During the life of the camera, it may be necessary for the relative focal position of the lens and imager to remain within tens of microns of the original manufacturing position. Thus, thermoplastic based cameras are becoming less feasible for automotive use as increased testing requirements push affordable thermoplastics to their limits. In other words, when compared to components formed from more expensive materials (e.g., metals like steel or aluminum), traditional camera components formed from thermoplastic (or similar materials) may be susceptible to greater tolerance variations (such as due to thermal expansion) that affect the focus and alignment of the camera. For example, the extreme conditions cameras are exposed to during environmental validation are meant to simulate an accelerated aging process for cameras in the field. An unintended consequence of this is that many traditional thermoplastics are held above their maximum service temperature for the duration of the tests. The combination of having the plastic in this state, and applying test conditions that are simultaneously exposing the cameras to high humidity, causes focus shifts. In other words, strict testing and performance requirements are causing cameras having traditional thermoplastic components to be considered less suitable for vehicular applications.

To reduce variations in the focus and alignment of the imager and lens over the life of the camera, the one or more cameras 14, 114 of the vision system 12 include one or more components formed from thermoplastic polymeric material that comprises cross-linkable species or units, such as, for example, cross-linkable repeating mers or units. For example, cross-linkable mers of the thermoplastic polymeric material are cross-linked, such as via electron beam (EB) treatment. Exposure to EB treatment improves the mechanical properties of the thermoplastic component or components. For example, the components formed from EB treated thermoplastic exhibit improved properties, such as increased heat resistance (i.e., less thermal expansion responsive to temperature changes), increased tensile and impact strength, increased resistance to chemical solvents, improved creep resistance, improved material stability, and greater abrasion resistance. The characteristic improvements, particularly the enhanced material stability and thermal resistance, result in improved performance (e.g., focal position stability) in environmental testing as well as real world performance with the camera mounted at the vehicle. Thus, EB treated thermoplastic components of a vehicular camera maintain tight tolerances and experience little to no shift or positional variation that would affect focus and alignment of the lens and imager.

Figure 4:
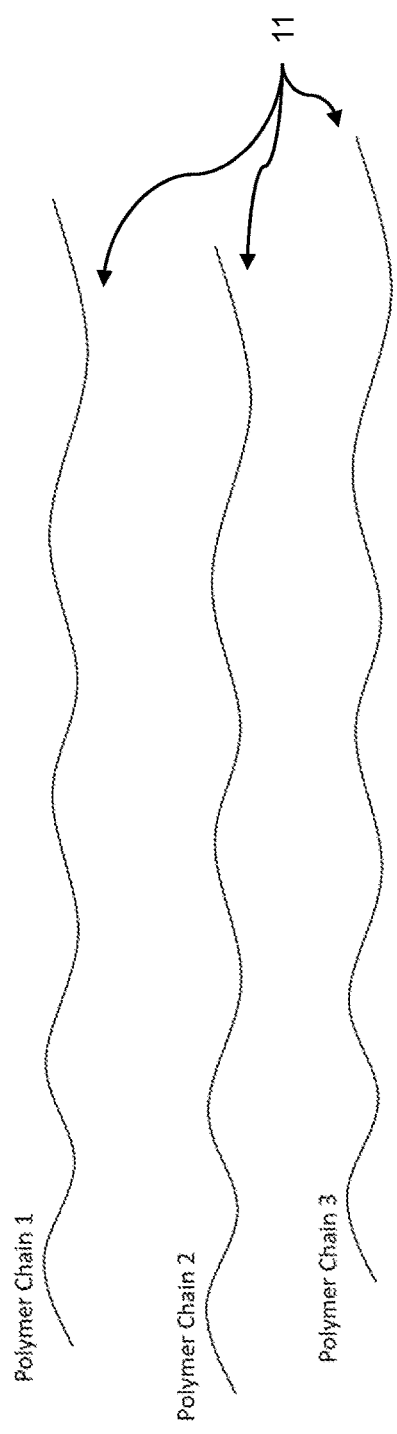
FIG. 4 is a schematic view of a thermoplastic material that has not undergone electron beam treatment.
Figure 5:
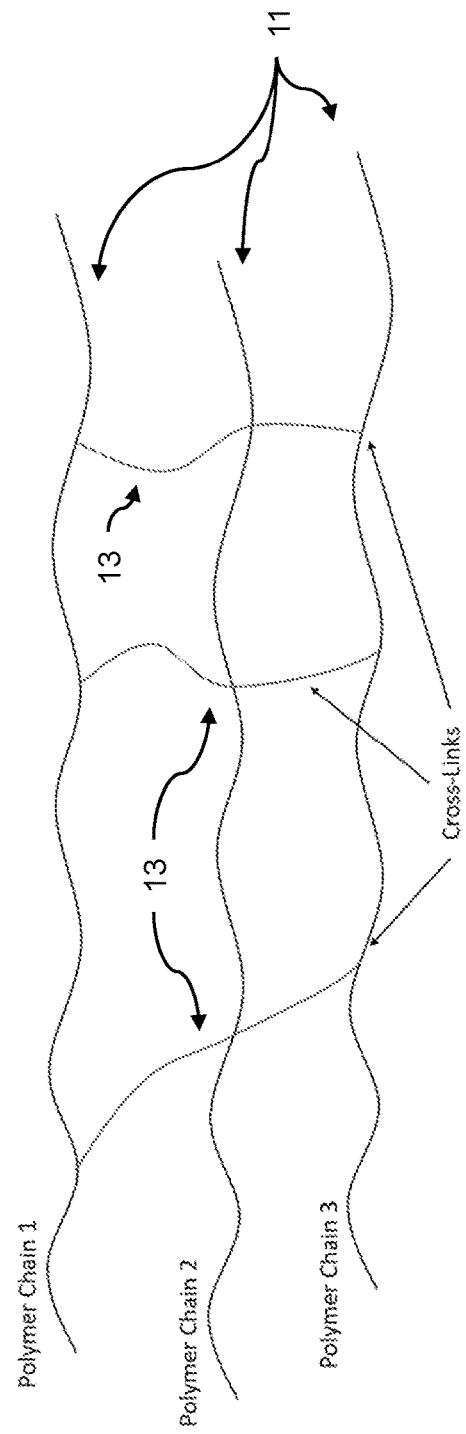
FIG. 5 is a schematic view of the thermoplastic material of FIG. 4 after the thermoplastic has undergone electron beam treatment.

FIG. 4 represents the polymer chains 11 of a thermoplastic camera component before undergoing EB treatment. FIG. 5 represents the polymer chains 11 after EB treatment. EB treatment may include directing a beam or flow of electrons at a component formed of thermoplastic. As shown in FIG. 5, the EB treatment results in the ionization of the polymer chains 11 and cross-linking of molecules. In other words, links 13 are formed between the respective polymer chains 11 of the thermoplastic material as the material gains or loses electrons. The EB treatment may ionize the entirety of the component or be directed at only a portion of the camera component.

That is, specific portions of the camera components susceptible to damage and/or structural transformation may undergo EB treatment to improve durability and structural integrity of the camera. For example, EB treatment may be directed toward the portion of the lens holder 26, 126 that receives the lens barrel 30 and/or EB treatment may be directed toward the threaded portion of the lens barrel 30, 130 to reduce tolerance changes at the interface between the lens barrel 30, 130 and the lens holder 26, 126 over the life of the camera. Similarly, EB treatment may be directed toward mating portions of the front housing 26, 126 and the rear housing 28, 128, portions of the front housing 26, 126 and/or rear housing 28, 128 that receive the imager PCB 22, 122, and the like.

EB treatment may be performed during the manufacturing process of the camera components (i.e., in-line), which results in no additional engineering bill of materials (BOM) cost and limited capital and manufacturing costs. While any thermoplastic component of the cameras 14, 114 may undergo EB treatment, EB treatment may be focused on components having the greatest tolerance effect on the focus and alignment of the lens and imager. For example, thermoplastic components may include, but are not limited to, one or more of the lens barrel, the lens holder or front housing, and the rear housing or rear cover. Optionally, mounting structure attaching the camera to the vehicle may include EB treated thermoplastic material.

Thus, the vehicular camera includes one or more components formed from thermoplastic and that have undergone EB treatment. The EB treatment ionizes the polymer chains to form links between molecules. EB treatment may be performed after forming the component (such as via plastic injection molding or any other suitable method) and before assembling the vehicular camera and performing focusing and alignment of the imager and lens. Thus, after the camera is assembled and the imager and lens are focused, the EB treated components will experience little to no mechanical changes that will affect focus and alignment of the imager and lens.

Optionally, any suitable sensor at the vehicle that relies on or could benefit from improved tolerances between the sensor and housing may be formed from EB treated thermoplastic, such as lidar or infrared imaging sensors or radar sensors or the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The camera may otherwise comprise any suitable construction for controlling or accommodating changes in the camera when the camera is exposed to extreme temperatures, such as below −20 degrees C. or below −40 degrees C. and/or above 60 degrees C. or above 80 degrees C., and may utilize aspects of the cameras described in U.S. Pat. No. 11,240,411 and/or U.S. Publication Nos. US-2020-0033549; US-2020-0154020; US-2020-0137926; US-2020-0001787; US-2019-0306966; US-2019-0121051; US-2019-0124243 and/or US-2019-0124238, which are all hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
an imager printed circuit board (imager PCB), wherein the imager PCB comprises a first side and a second side opposite the first side and separated from the first side by a thickness of the imager PCB, and wherein an imager is disposed at the first side of the imager PCB;
a lens barrel accommodating a lens;
a camera housing comprising a first portion and a second portion configured to join together with the first portion;
wherein the lens barrel is disposed at the first portion of the camera housing;
wherein the imager PCB is attached at one selected from the group consisting of (i) the first portion of the camera housing and (ii) the second portion of the camera housing, and wherein, with the imager PCB attached at the one selected from the group consisting of the first portion of the camera housing and the second portion of the camera housing, and with the lens barrel disposed at the first portion of the camera housing, the imager at the first side of the imager PCB faces the lens accommodated by the lens barrel; and
wherein the vehicular camera assembly comprises at least one component that (i) is formed of a thermoplastic material, and (ii) has undergone electron beam treatment (EB treatment), and wherein the EB treatment crosslinks molecules between polymer chains of the thermoplastic material.

2. The vehicular camera assembly of claim 1, wherein the at least one component comprises the lens barrel.

3. The vehicular camera assembly of claim 1, wherein the at least one component comprises the first portion of the camera housing.

4. The vehicular camera assembly of claim 1, wherein the at least one component comprises the second portion of the camera housing.

5. The vehicular camera assembly of claim 1, wherein the at least one component comprises each of (i) the lens barrel, (ii) the first portion of the camera housing and (iii) the second portion of the camera housing.

6. The vehicular camera assembly of claim 1, wherein the imager PCB is attached at the second portion of the camera housing.

7. The vehicular camera assembly of claim 6, wherein, during assembly of the vehicular camera assembly and with the lens barrel fixed relative to the first portion of the camera housing, the second portion of the camera housing is adjusted relative to the first portion of the camera housing to focus and align the imager relative to the lens.

8. The vehicular camera assembly of claim 1, wherein, during assembly of the vehicular camera assembly and with the first portion of the camera housing fixed relative to the second portion of the camera housing, the lens barrel is adjusted relative to the first portion of the camera housing to focus and align the imager relative to the lens.

9. The vehicular camera assembly of claim 1, wherein EB treatment is applied to a structural portion of the at least one component.

10. The vehicular camera assembly of claim 9, wherein the at least one component comprises the first portion of the camera housing, and wherein EB treatment is applied to a portion of the first portion of the camera housing that receives the lens barrel.

11. A method of assembling a vehicular camera assembly, the method comprising:
   providing a camera housing comprising a first portion and a second portion configured to join together with the first portion;
   providing a lens barrel accommodating a lens;
   performing electron beam treatment (EB treatment) on at least one component selected from the group consisting of (i) the lens barrel, (ii) the first portion of the camera housing and (iii) the second portion of the camera housing;
   after performing EB treatment, disposing the lens barrel at the first portion of the camera housing;
   after performing EB treatment, attaching an imager printed circuit board (imager PCB) at one of the first portion or the second portion of the camera housing, wherein the imager PCB comprises a first side and a second side opposite the first side and separated from the first side by a thickness of the imager PCB, and wherein an imager is disposed at the first side of the imager PCB; and
   wherein, with the imager PCB attached at one of the first portion or the second portion of the camera housing and with the lens barrel disposed at the first portion of the camera housing, the imager at the first side of the imager PCB faces the lens accommodated by the lens barrel.

12. The method of claim 11, comprising performing EB treatment on each of (i) the lens barrel, (ii) the first portion of the camera housing and (iii) the second portion of the camera housing.

13. The method of claim 11, comprising attaching the imager PCB at the second portion of the camera housing.

14. The method of claim 13, comprising, with the lens barrel fixed relative to the first portion of the camera housing, adjusting the second portion of the camera housing relative to the first portion of the camera housing to focus and align the imager relative to the lens.

15. The method of claim 11, comprising, with the first portion of the camera housing fixed relative to the second portion of the camera housing, adjusting the lens barrel relative to the first portion of the camera housing to focus and align the imager relative to the lens.

16. The method of claim 11, wherein performing EB treatment comprises applying EB treatment to a structural portion of the at least one component.

17. The method of claim 16, wherein the at least one component comprises the first portion of the camera housing, and wherein EB treatment is applied to a portion of the first portion of the camera housing that receives the lens barrel.

18. A vehicular camera assembly, the vehicular camera assembly comprising:
   an imager printed circuit board (imager PCB), wherein the imager PCB comprises a first side and a second side opposite the first side and separated from the first side by a thickness of the imager PCB, and wherein an imager is disposed at the first side of the imager PCB;
   a lens barrel accommodating a lens;
   a camera housing comprising a first portion and a second portion configured to join together with the first portion;
   wherein the lens barrel is disposed at the first portion of the camera housing;
   wherein the imager PCB is attached at one selected from the group consisting of (i) the first portion of the camera housing and (ii) the second portion of the camera housing, and wherein, with the imager PCB attached at the one selected from the group consisting of the first portion of the camera housing and the second portion of the camera housing, and with the lens barrel disposed at the first portion of the camera housing, the imager at the first side of the imager PCB faces the lens accommodated by the lens barrel;
   wherein the vehicular camera assembly comprises at least two components that (i) is formed of a thermoplastic material, and (ii) has undergone electron beam treatment (EB treatment), and wherein the EB treatment crosslinks molecules between polymer chains of the thermoplastic material; and
   wherein the at least two components comprise (i) the lens barrel and (ii) a structural portion of the first portion of the camera housing that receives the lens barrel.

19. The vehicular camera assembly of claim 18, wherein the imager PCB is attached at the second portion of the camera housing, and wherein, during assembly of the vehicular camera assembly and with the lens barrel fixed relative to the first portion of the camera housing, the second portion of the camera housing is adjusted relative to the first portion of the camera housing to focus and align the imager relative to the lens.

20. The vehicular camera assembly of claim 18, wherein, during assembly of the vehicular camera assembly and with the first portion of the camera housing fixed relative to the second portion of the camera housing, the lens barrel is adjusted relative to the first portion of the camera housing to focus and align the imager relative to the lens.

* * * * *